(12) United States Patent
Tejima

(10) Patent No.: US 6,269,711 B1
(45) Date of Patent: Aug. 7, 2001

(54) TRANSMISSION DEVICE USING FLEXIBLE GEAR

(75) Inventor: Kenji Tejima, Mie (JP)

(73) Assignee: Teijin Seiki Company Limited, Osaka (JP)

( * ) Notice: Subject to any disclaimer, the term of this patent is extended or adjusted under 35 U.S.C. 154(b) by 0 days.

(21) Appl. No.: 09/372,333

(22) Filed: Aug. 11, 1999

(30) Foreign Application Priority Data

Aug. 12, 1998 (JP) .................................................. 10-227820
Oct. 21, 1998 (JP) .................................................. 10-299490

(51) Int. Cl.⁷ ...................................................... F16H 1/00
(52) U.S. Cl. ............................................. 74/640; 384/512
(58) Field of Search ................................ 74/640; 384/512

(56) References Cited

U.S. PATENT DOCUMENTS

| | | |
|---|---|---|
| 3,996,816 | 12/1976 | Brighton . |
| 4,078,454 * | 3/1978 | Murakami et al. .................... 74/640 |
| 4,196,271 * | 4/1980 | Yamada et al. ...................... 525/242 |
| 4,518,308 * | 5/1985 | Grzybowski et al. ............. 74/640 X |
| 4,601,216 * | 7/1986 | Inoue et al. ............................ 74/640 |
| 4,625,582 * | 12/1986 | Kiryu ..................................... 74/640 |
| 4,716,785 * | 1/1988 | Godai et al. ........................... 74/640 |
| 4,756,203 * | 7/1988 | Matsuda ............................ 74/640 X |
| 5,639,167 * | 6/1997 | Hans et al. ....................... 384/512 X |
| 5,667,455 * | 9/1997 | Suzuki et al. .................... 384/512 X |
| 5,850,765 * | 12/1998 | Shirasawa .............................. 74/640 |
| 5,860,331 | 1/1999 | Hashimoto et al. . |
| 6,026,711 * | 2/2000 | Tortora et al. ........................ 74/640 |

* cited by examiner

Primary Examiner—Charles A Marmor
Assistant Examiner—Ha Ho
(74) Attorney, Agent, or Firm—Akin, Gump, Strauss, Hauer & Feld, L.L.P.

(57) ABSTRACT

In a flexible type transmission device, an angular ball bearing is interposed between an output member and a fixed case so as to support the output member and the fixed case while permitting relative rotation between the output member and the fixed case. The loads acting on the output member and fixed case are received using the rolling contact of steel balls included in the angular ball bearing.

4 Claims, 8 Drawing Sheets

TRANSMISSION DEVICE USING FLEXIBLE GEAR

BACKGROUND OF THE INVENTION

The present invention relates to a transmission device using a flexible gear (hereafter referred to as a flexible type transmission device, when applicable) which provides a speed-reduced output using a large number of external teeth on a flexible member capable of flexing substantially in an elliptical manner and a large number of internal teeth capable of meshing partially with the external teeth. The flexible type transmission device can be used not only as a speed-reducing device, but also as a speed-increasing device and a differential device.

A flexible type transmission device generally comprises: a fixed case (serving as a circular spline) including a large number of internal teeth formed on the inner periphery thereof; a flexible member (serving as a flexible spline) inserted into the fixed case and including a large number of external teeth formed on the outer periphery thereof with the number of the external teeth slightly smaller than the number of the internal teeth of the fixed case, the external teeth being capable of partially meshing with the internal teeth of the fixed case when the flexible member is flexed substantially in an elliptical manner; a wave generator accommodated within the flexible member and rotatable with respect to the flexible member for applying a substantially elliptical flexural deflection to the flexible member; and, an output member connected to the flexible member. To rotatably support the output member on the fixed case, interposed between the fixed case and output member is a cross roller bearing composed of a large number of cylindrical-shaped rollers arranged in the peripheral direction thereof with the inclining directions thereof alternately reversed. Alternatively, there is interposed a taper roller bearing composed of two roller races, each roller race including a large number of cylindrical-shaped rollers disposed in the peripheral direction and spaced from one another, the rollers of the respective roller races being inclined in the opposite directions with respect to the axial direction.

However, the above-noted support structure for the flexible type transmission device suffers from a problem in that since the outer surfaces of the rollers of the cross roller bearing or taper roller bearing are slidingly contacted with the output member and the race surfaces of the fixed case during the rotation of the output shaft, the rollers, output member and fixed case are worn out early and thus the service lift of them is shortened. Further, the cross roller bearing and taper roller bearing are both expensive generally.

SUMMARY OF THE INVENTION

The invention aims at eliminating the drawbacks found in the above-structured transmission device. Accordingly, it is an object of the invention to provide a flexible type transmission device which can be manufactured at a low cost as well as can extend its life.

In attaining the above object, according to a first aspect of the invention, there is provided a flexible type transmission device, comprising: a case including a large number of internal teeth formed on the inner periphery thereof; a flexible member which is inserted into the case and includes a large number of external teeth formed on the outer periphery thereof in such a manner that, when the flexible member is flexed and deformed in a substantially elliptical manner, the external teeth partially mesh with the internal teeth of the case; a wave generator accommodated within the flexible member and rotatable with respect to the flexible member for applying substantially elliptical flexure and deformation to the flexible member; and, a support member connected to the flexible member, wherein an angular ball bearing is interposed between the case and support member, whereby the support member and case are supported by the angular ball bearing in such a manner that they can be rotated with respect to each other.

According to a second aspect of the invention, there is provided a flexible type transmission device, comprising: a case including a large number of internal teeth formed on the inner periphery thereof; a flexible member which is inserted into the case and includes a large number of external teeth formed on the outer periphery thereof, the external teeth being partially in mesh with the internal teeth of the case; a wave generator accommodated within the flexible member and rotatable with respect to the flexible member for applying substantially elliptical flexural deformation to the flexible member; and, a support member including on the inner periphery thereof a large number of inner teeth, the number of the inner teeth of the support member differing from the number of the internal teeth of the case, the internal teeth being partially in mesh with the external teeth of the flexible member, wherein an angular ball bearing is interposed between the case and support member, whereby the support member and case are supported by the angular ball bearing in such a manner that they can be rotated with respect to each other.

In the transmission device structured according to the first aspect of the invention, since there is interposed the angular ball bearing between the case and support member, even if a thrust load and a radial load are acting thereon, the support member can be rotated smoothly. Because the angular ball bearing supports the loads with its rolling contact, there is hardly produced friction, which makes it possible to extend the life of the transmission device. Also, since the angular ball bearing is more inexpensive than the cross roller bearing and taper roller bearing, the production cost of the transmission device can be lowered. The transmission device structured according to the second aspect of the invention can obtain similar operation and effects as those described above.

If the transmission device is structured in such a manner the flexible member and the support member are formed as a single unitary member, the flexible member and support member can be worked at the same time, resulting in the enhanced concentricity thereof. And, there is eliminated the need for use of members which have been conventionally used to fasten together the flexible member and support member, such as bolts, positioning pins, O rings and the like. This not only can simplify the structure of the transmission device, but also eliminates the need for execution of operations for fastening together the flexible member and support member, such as an operation to work holes for the bolts, an operation to work holes for the positioning pins, an operation to work grooves for the O rings, an operation to screw the bolts, and the like, thereby being able to simplify the manufacturing process of the transmission device. Further, it is possible to omit the boss portions that have been conventionally used to fasten together the flexible member and support member. Moreover, it is possible to form a thickness reduced portion (a hollow portion) in the central portion of the support member without degrading the sealing property thereof. Consequently, the weight of the transmission device can be reduced.

Assuming that the race surface of the angular ball bearing is formed directly on the outer surface of the support member, it is inevitable to employ an expensive thermal treatment (for example, high-frequency quenching) in order to increase the surface hardness of the race surface only. This can be overcome with the use of the structure in which a discrete inner race member is fixed to the support member. To harden the race surface of the angular ball bearing requiring high hardness, the inner race member is subjected to an inexpensive thermal treatment (for example, simple quenching, i.e. simply dipping the heated inner race member into a fluid) prior to fixing the inner race member onto the support member. Therefore, the hardening operation can be made inexpensive and easy.

It is preferable to form portions, each V-shaped in section, on the inner race member and the case as inner and outer race surfaces and hold a large number of steel balls therebetween. This arrangement can reduce the manufacturing cost of the bearing since the formation of only one V-shaped portion suffices to construct a race surface on each of the inner race member and the case. Further, this arrangement can reduces the installation space necessary for the bearing, thereby shortening the length of the flexible type transmission device in the axial direction thereof.

In addition, if the flexible type transmission device is structured such that the inner face member is pressure-fitted onto the outer side of the support member with an adhesive agent interposed therebetween, then not only the concentricity thereof can be enhanced but also they can be connected together strongly.

The present disclosure relates to the subject matter contained in Japanese patent application Nos. Hei. 10-227820 (filed on Aug. 12, 1998) and Hei. 10-299490 (filed on Oct. 21, 1998), which are expressly incorporated herein by reference in their entireties.

BRIEF DESCRIPTION OF THE SEVERAL DRAWINGS

DETAILED DESCRIPTION OF THE INVENTION

Now, description will be given below of a first embodiment of a flexible type transmission device according to the accompanying drawings.

Figure 1:
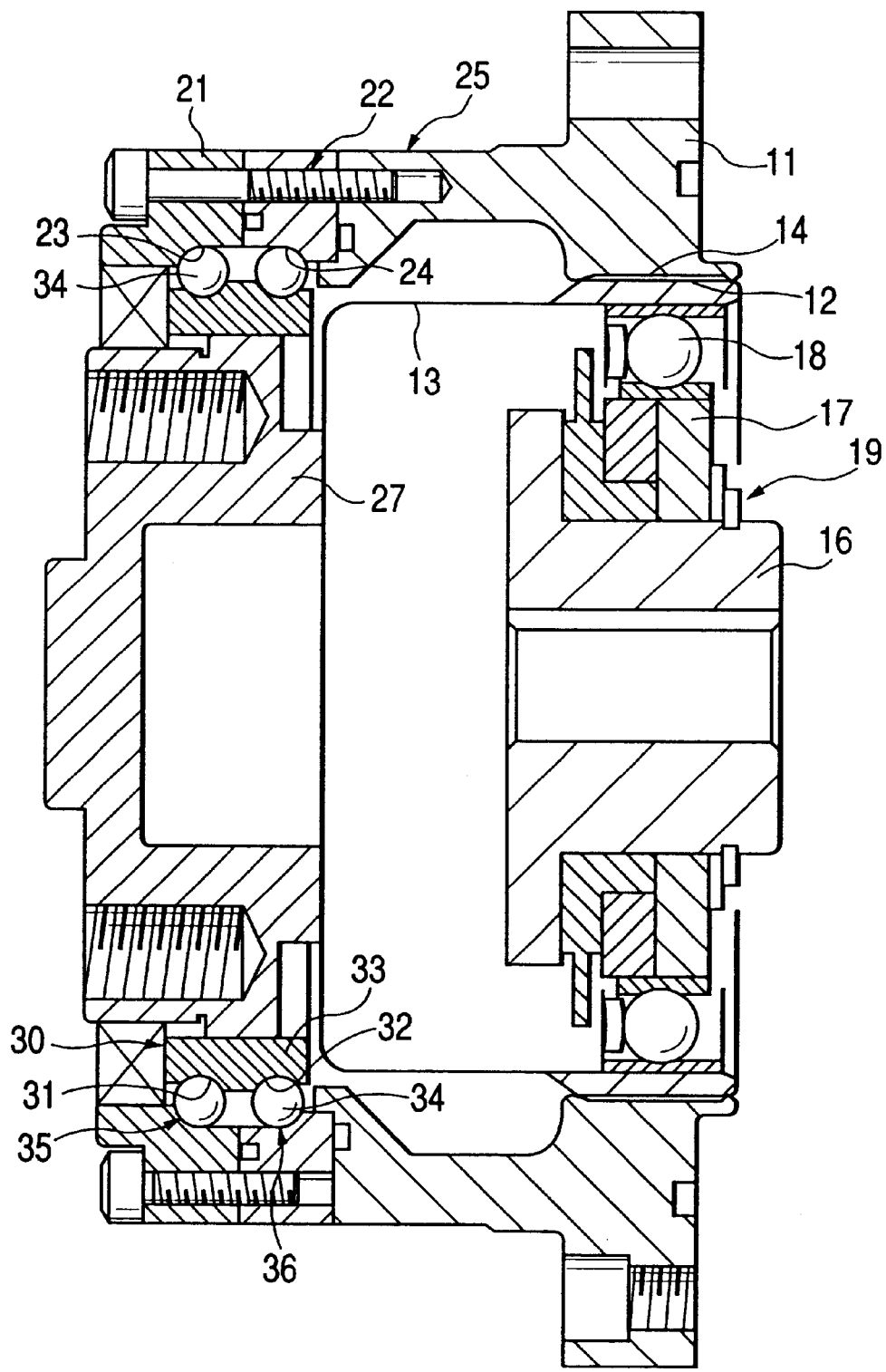
FIG. 1 is a front section view of a first embodiment of a flexible type transmission device according to the invention.

In FIG. 1, reference character 11 designates a substantially-cylindrical-shaped case main body to be fixed to a fixed or stationary portion (not shown). The case main body 11 includes a plurality of internal teeth 12 formed on the inner periphery of one end portion thereof. The case main body 11 serves as a circular spline of a flexible type transmission device. Reference character 13 stands for a cup-shaped flexible member which is inserted into the case main body 11, which is closed at one side end thereof to which a support member or output member 27 is provided. Alternatively, the flexible member 13 may also be formed into a silk-hat shape having a flanged portion which extends radially outwardly from one end side thereof and which is connected to the support member or output member 27. The flexible member 13 is mainly formed of thin metal material and thus can be flexed or deformed easily. A plurality of external teeth 14 are formed on the outer periphery of the other opened end portion of the flexible member 13. The number of the external teeth 14 is slightly smaller than that of the internal teeth 12 of the case main body 11. When the flexible member 13 represents a circular shape in section, the diameter of the addendum of each external tooth 14 is slightly smaller than the diameter of the addendum of each internal tooth 12 and thus the two kinds of teeth 12 and 14 do not mesh with each other. The flexible member 13 serves as a flexible spline of the flexible type transmission device. Reference numeral 16 designates an input shaft which is loosely fitted to the inside of the flexible member 13 through certain components such as an elliptical cam 17 and an elliptical-shaped ball bearing 18. The elliptical cam 17 is fixed to the outer periphery of the input shaft 16, and the elliptical-shaped ball bearing 18 is mounted on the outside of the elliptical cam 17. The length of the major axis of the ball bearing 18 is larger than the inside diameter of the flexible member 13 when the flexible member 13 represents a circular shape in cross section, whereas the minor axis of the ball bearing 18 is not larger than said inside diameter. With this configuration, the outer periphery of the major axis portion of the ball bearing 18 is contacted with the inner periphery of the opened end portion of the flexible member 13 to push out the flexible member 13 radially outwardly at diametrically opposite locations to thereby flex or deform the opened end portion of the flexible member 13 in a substantially elliptical manner. Due to this, part of the external teeth 14, which are disposed in the portions pushed out in the radial direction, are allowed to mesh with part of the internal teeth 12 corresponding to the pushed-out portions. Under this state, if the input shaft 16, elliptical cam 17 and ball bearing 18 are rotated together in an integral manner, then the flexible member 13 is given substantially elliptical flexural deformation which is rotatingly moved on the flexible member 13, thereby moving the mutually meshing positions between the external teeth 14 and internal teeth 12 in the peripheral direction of the flexible member 13. In this operation, since the external teeth 14 are slightly smaller in number than the internal teeth 12 as described above, the flexible member 13 is revolved at an amount corresponding to the difference between the numbers of the external teeth 14 and internal teeth 12 per one rotation of the input shaft 14. The thus produced revolution of the flexible member 13 is taken out from the output member 27 as the speed-reduced rotation. The above-mentioned input shaft 16, elliptical cam 17 and ball bearing 18, as a whole, are accommodated within the flexible member 13 and cooperate together in forming a wave generator 19 which is capable of applying the substantially elliptical flexural deformation to the flexible member 13.

In the drawings, reference characters 21 and 22 designate a pair of outer rings which are fixed to the other end face of the case main body 11 and are superimposed on each other in the axial direction of the case main body 11. Annular-shaped race surfaces 23 and 24 are formed on inner peripheries of the outer rings 21 and 22 so that steel balls (which will be discussed later) are rollingly contacted with these race surfaces 23 and 24. The outer rings 21 and 22 are in the form of two rings which are designed for the purpose of applying a preload to a double race angular ball bearing (which will be described later). The above-mentioned case main body 11 and outer rings 21, 22, as a whole, cooperate together in forming a fixed case (which corresponds to a case according to the invention) 25 as well as the outer rings 21 and 22 also function part of a double race angular ball bearing (which will be discussed later). Reference numeral 27 stands for a substantially cylindrical-shaped output member serving as a support member which is formed integrally with and continuous to the flexible member 13. That is, the bottom wall of the closed end of the flexible member 13 is connected to one end of the output member 27. If the output member 27 and flexible member 13 are formed integrally with each other, then the simultaneous working of the flexible member 13 and output member 13 is possible, which makes it possible to enhance the concentricity of the flexible member 13 and output member 13. Also, if the flexible member and output member are not formed integrally with each other but are formed separately and are thereafter fastened to each other, there are necessary members which are used to fasten them together, such as bolts, positioning pins, O rings and the like. However, if the flexible member and output member are formed in an integrally united body as described above, then it is possible to eliminate the need for provision of the fastening members, so that the structure of the flexible type transmission device can be simplified. Moreover, it is possible to eliminate the need to carry out operations which are necessary to fasten the flexible and output members together, such as an operation to work holes for the bolts or pins, an operation to work grooves for the O rings, an operation to screw the bolts, which makes it possible to simplify the manufacturing process of the flexible type transmission device. Further, it is possible to omit the boss portions that have been conventionally necessary to fasten the flexible member and output member to each other and also it is possible to form a thickness reduced portion (a hollow space) in the central portion of the output member (support member) 27 with the sealing property thereof maintained as it is, so that the weight of the flexible type transmission device can also be reduced.

Figure 2:
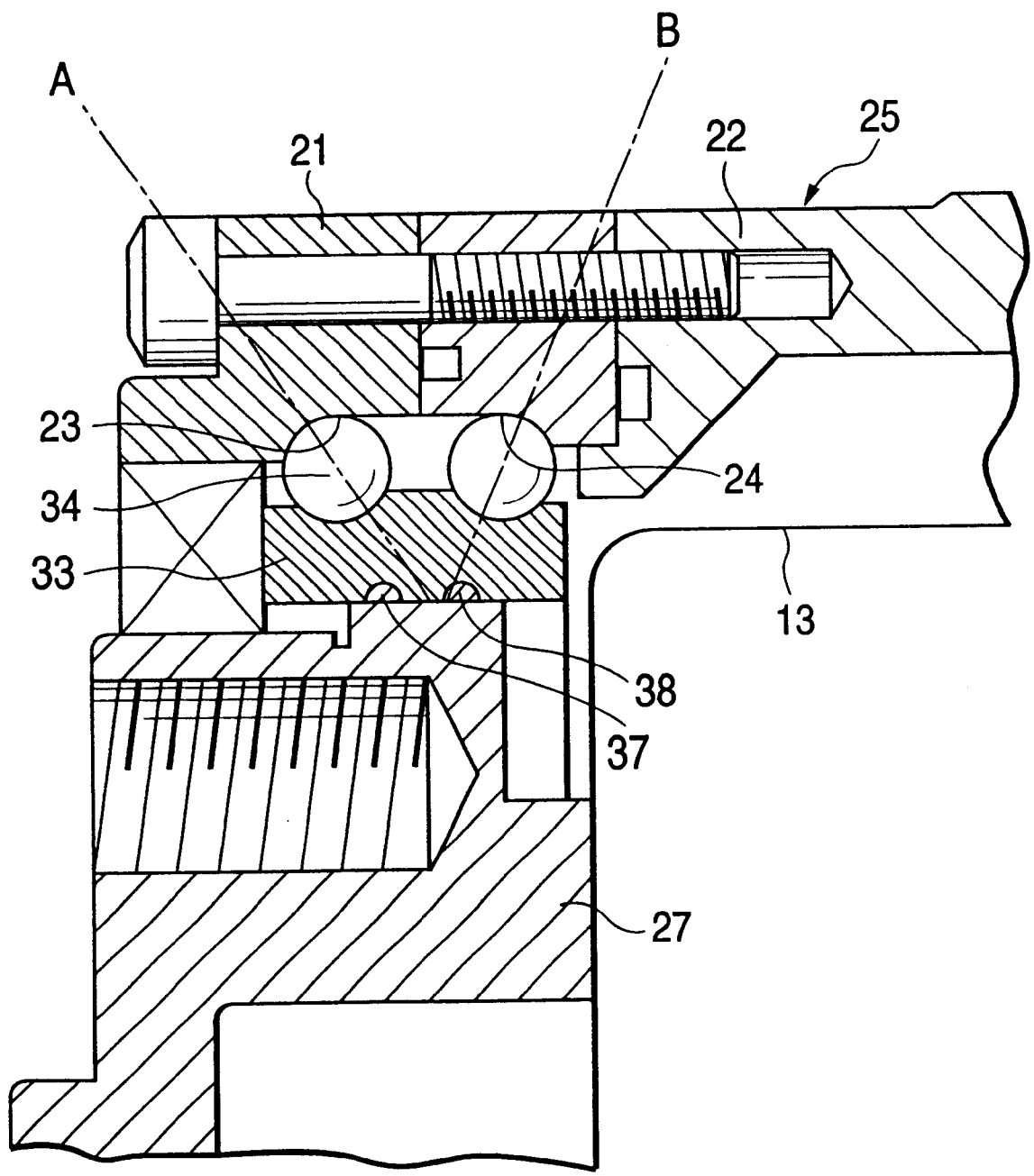
FIG. 2 is an enlarged section view of the inner race and its neighboring portion of the first embodiment.

Between the output member 27 and the fixed case 25 (e.g. each of the outer rings 21 and 22), a bearing such as a cross roller bearing, a taper roller bearing, an angular ball bearing or the like can be disposed, but in the present embodiment, a double race angular ball bearing 30 is disposed. The double race angular ball bearing 30 in this embodiment is arranged, as best shown in FIG. 2, such that the contact angles (lines) A and B of two races of balls are inclined in opposite directions and broadened radially outwardly. The double race angular ball bearing 30 supports the output member 27 and fixed case 2 while permitting a mutual rotation between the output member 27 and fixed case 2. The double race angular ball bearing 30 includes an inner race member 33 which is formed with two parallel annular race surfaces 31 and 32 on the outer periphery thereof, and which is fixed to the outside of the output member 27. To fix the output member 27 and inner race member 33 to each other, as shown in FIG. 2, a plurality of peripherally extending grooves formed on the inner periphery of the inner race 33, here, two peripherally extending grooves 38 are filled with an adhesive 37, the adhesive is also applied onto the inner periphery of the inner race member 33 and the outer periphery of the output member 27; and, after then, the inner race member 33 is pressure fitted onto the outside of the output member 27, so that the adhesive 37 can be interposed between the output member 27 and inner race 33. Here, referring in particular to the adhesive, at least one of the filling of the adhesive into the peripherally extending grooves 38, the application of the adhesive onto the inner periphery of the inner race member 33 and the application of the adhesive onto the outer periphery of the output member 27 maybe executed. That is, if the fixation between the output member 27 and inner race 33 is executed by the incorporation of the pressure insertion of the inner race 33 into the outside of the output member 27 with the above-mentioned use of the adhesive, then not only the concentricity between the output member 27 and inner race 33 can be enhanced but also the connection between them can be made strong. Now, reference characters 35 and 36 designate two races of steel balls which can be rollingly contacted with their respective race surfaces 31 and 32 of the inner race member 33. Each race is composed of a large number of steel balls 34. The steel balls 34 of the two steel ball races 35 and 36 are also in rolling contact with the annular race surfaces 23 and 24 of the outer rings 21 and 22. The above-mentioned outer rings 21, 22, inner race member 33, and steel ball races 35, 36 cooperate together in forming the above-mentioned double race angular ball bearing 30. Here, it is conceivable to form the race surfaces of the angular ball bearing directly on the outer surface of the output member. However, since the steel balls are to be rollingly contacted with the race surfaces, the race surfaces must be high in hardness and, on the other hand, because the remaining portions of output member other than the race surfaces must be subjected to grinding or similar operations, they must not be high in hardness. For this reason, to make only the race surfaces high in hardness locally, an expensive thermal treatment (such as high-frequency quenching operation) is required to be employed. In contrast, as described above, if the annular race surfaces 31 and 32 are formed on the inner race member 33 produced separately from the output member 27 so that the inner race member 33 is pressure fitted onto and fixed to the outside of the output member 27, then the race surfaces 31 and 32 of the angular ball bearing 30 requiring high hardness can be hardened up to the necessary hardness simply by carrying out an inexpensive thermal treatment (such as a simple quenching operation). Consequently, the hardening operation can be made inexpensive and easy. It is also conceivable to use, instead of the double race angular ball bearing 30, a pair of single race angular ball bearings. However, in this case, the length of the whole transmission device in the axial direction thereof is made longer and there is required a preload apply structure, so that the whole transmission device is made larger in diameter. This is the reason why the present embodiment uses the double race angular ball bearing 30.

Next, description will be given below of the operation of the above-mentioned first embodiment of a flexible type transmission device according to the invention.

It is now assumed that a rotation drive force is transmitted to the input shaft 16 from a motor (not shown) and thus the input shaft 16, elliptical cam 17 and ball bearing 18 are rotating together in an integral manner. In this state, since the portion of the flexible member 13, which is in contact with the major diameter portion of the ball bearing 18, is flexed and deformed outwardly in the radial direction thereof, the end portion of the flexible member 13 is deformed substantially in an elliptical manner to thereby cause the external teeth 14 and internal teeth 12 to mesh with each other in part. This meshing position between the external teeth 14 and internal teeth 12 is caused to move in the peripheral direction due to the rotation of the ball bearing 18. Here, because the number of the external teeth 14 is slightly smaller than that of the internal teeth 12, the flexible member 13 is rotated or revolved at an amount corresponding to the difference between the numbers of the external teeth 14 and internal teeth 12 per one rotation of the input shaft 16. The revolution of the flexible member 13 is taken out from the out put member 27 as a speed-reduced rotation. During this operation, since the angular ball bearing 30 is interposed between the fixed case 25 and output member 27, even if a thrust load and a radial load are applied onto the output member 27 in any directions, the output member 27 is allowed to rotate smoothly while being supported by the fixed case 25. Further, because the angular ball bearing 30 supports the above-mentioned loads through its rolling contact, there is hardly generated friction, which makes it possible to extend the life of the angular ball bearing 30. In addition, since the angular ball bearing 30 is lower in cost than the cross roller bearing and taper roller bearing, the use of the angular ball bearing 30 makes it possible to lower the cost of the transmission device.

Figure 3:
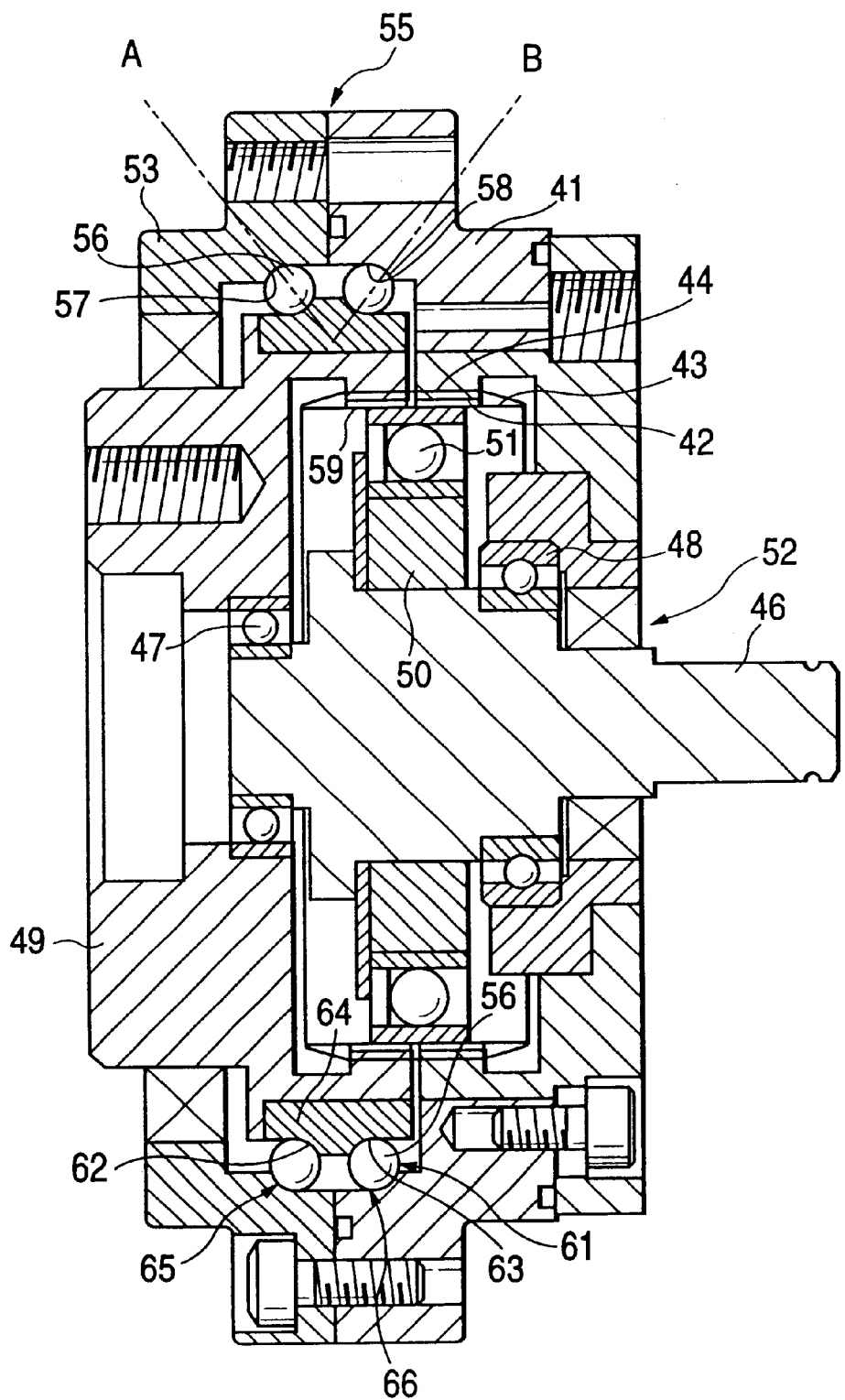
FIG. 3 is a front section view of a second embodiment of a flexible type transmission device according to the invention.

Now, FIG. 3 shows a second embodiment of a flexible type transmission device according to the invention. In the second embodiment, a large number of internal teeth 42 is formed on the inner periphery of the central portion of the case main body 41, while a cylindrical-shaped flexible member 43 is inserted into the case main body 41. Here, on the outer periphery of the flexible member 43, there are formed a large number of external teeth 44, while the number of the external teeth 44 is equal to the number of the internal teeth 42. Also, an input shaft 46, which is loosely fitted into the flexible member 43, is rotatably supported by an output member (which corresponds to a support member) 49 and case main body 41 through bearings 47 and 48. An elliptical cam 50 is mounted on the outside of the input shaft 46 and, further, on the outside of the elliptical cam 50, there is mounted an elliptical-shaped ball bearing 51 which is accommodated in the flexible member 43. Similarly to the previously described first embodiment, the flexible member 43 is given substantially elliptical flexural deformation, which rotates on the flexible member 43, by wave generator 52 including the input shaft 46, elliptical cam, and ball bearing 51. In FIG. 3, reference character 53 designates an outer ring which is fixed to the case main body 41. The outer ring 53 cooperates with the case main body 41 to form a fixed case (which corresponds to a case) 55. The outer ring 53 includes on the inner periphery thereof an annular race surface 57 with which steel balls 56 can be rollingly contacted. Also, on the periphery of the other end portion of the case main body 41 as well, there is formed an annular race surface 58 with which the steel balls 56 can be rollingly contacted. On the other hand, on the periphery of one end portion of the output member 49, there are formed a large number of internal teeth 59 which are slightly different in number from the internal teeth 42; in particular, in the present embodiment, the number of the internal teeth 59 is slightly larger than that of the internal teeth 42. As a result of this, as has been described before, if the flexible member 43 is flexed and deformed substantially in an elliptical manner, then the internal teeth 42, 59 mesh with the external teeth 59 in part, whereas the meshing positions between them are moved in the peripheral direction due to the rotation of the input shaft 46. Here, as described above, because the number of the internal teeth 59 is slightly different from (in particular, in the present embodiment, slightly larger than) the number of the internal teeth 42, the output member 49 is revolved or rotated at an amount corresponding to the difference between the numbers of the internal teeth 42 and 59 per one rotation of the input shaft 46, and the revolution or rotation of the output member 49 is taken out as a speed-reduced rotation. Reference character 61 designates a double race angular ball bearing which is interposed between the fixed case 55 and output member 49. The double race angular ball bearing 61 is structured such that the contact angles (lines) A and B of the two races of balls are inclined in opposite directions and broadened radially outwardly. Here, the double race angular ball bearing 61 is made up of the above-mentioned annular race surfaces 57 and 58; an inner race member 64 which includes on the outer periphery thereof two annular race surfaces 62 and 63 and which is pressure fitted onto the outside of the output member 49 and fixed thereto by an adhesive; and, two steel ball races 65 and 66 which can be rollingly contacted with not only the annular race surfaces 62 and 63 of the inner race 64 but also the annular race surfaces 57 and 58. Each steel ball race is made up of a large number of steel balls 56. The double race angular ball bearing 61 supports the output member 49 and fixed case in such a manner that they can be rotated with respect to each other. Here, it can also be imagined that the annular race surfaces are formed on the outer periphery of the output member and the inner race is omitted. However, in this case, although the required mechanical properties of the inner teeth differ from those of the annular race surfaces, as they are made of one kind of material, the mechanical properties of them cannot but be the same, with the result that they cannot be given their respective desired mechanical properties. For this reason, in the present embodiment, the two annular race surfaces 62 and 63 are formed on the inner race 64 which is produced separately from the output member 49, and the inner race 64 is pressure inserted into the output member 49 and fixed thereto by the adhesive. By the way, the remaining portions of the structure and operation of the second embodiment are similar to those of the previously described first embodiment.

Figure 4:
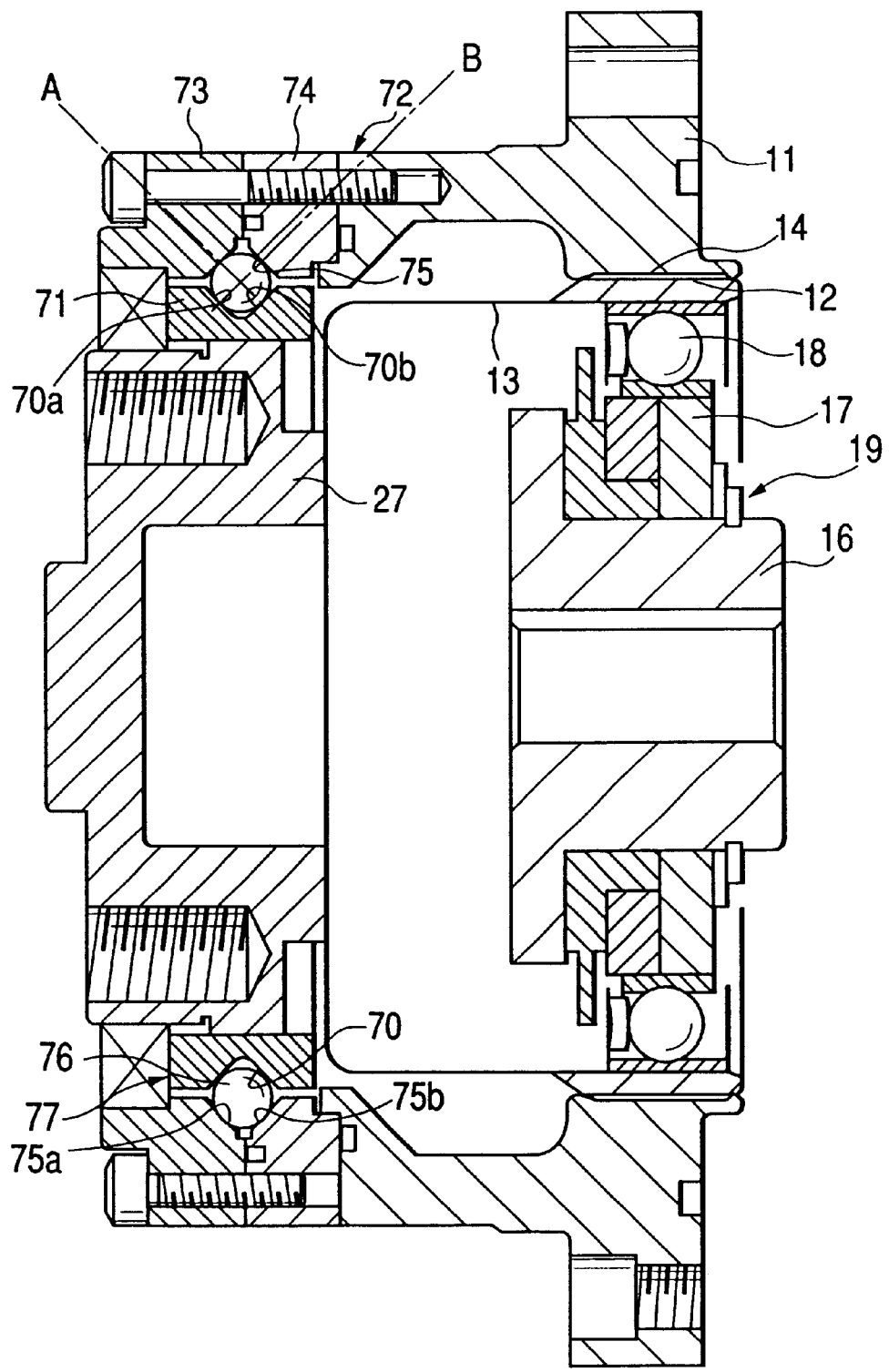
FIG. 4 is a front section view of a third embodiment of a flexible type transmission device according to the invention.

Now, FIG. 4 shows a third embodiment of a flexible type transmission device according to the invention. In the third embodiment, an annular race surface 70 having a V-shaped section is formed on the outer periphery of an inner race member 71 which is pressure fitted onto the outer periphery of an output member (support member) 27 and which is fixed thereto by an adhesive. On the inner periphery of a fixed case 72, in more particular, on the inner peripheries of two outer rings 73 and 74, there is formed an annular race surface 75 which, as a whole, has a V-shaped section. A large number of steel balls 76 are disposed with a space defined by the inner race 71 and outer rings 73, 74 so that each of the steel balls 76 is slidingly contacted at total four points (at two points with the inclined surfaces 70a and 70b of the race surface 70 of the inner race member 71 and at two points with the inclined surfaces 75a and 75b of the race surface 75 of the outer rings 73 and 74. The steel balls 76 are spaced from each other in the peripheral direction thereof. The above-mentioned inner race member 71, outer rings 73, 74 (they are also part of the fixed case 72), and steel balls 76, as a whole, cooperate together to form a single race angular ball bearing 77, not a double race angular ball bearing. In the angular ball bearing 77, each of the steel balls 76 is given two contact angles (lines) A and B, one being formed as a consequence of the contact of the steel ball 76 with the inclined surfaces 70*a* and 75*b* and the other being formed as a consequence of the contact of the steel ball 76 with the inclined surfaces 70*b* and the inclined surface 75*a*. (That is, the former angle is an angle between a straight line B connecting two contact points on the inclined surfaces 70*a* and 75*b* and a radially extending line intersecting the straight line B, whereas the latter angle is an angle between a straight line A connecting two contact points on the inclined surfaces 70*b* and 75*a* and the radially extending line intersecting the straight line A.) The inclining directions of the two contact angles are opposite to each other. In the present embodiment, since only one race surface, i.e. either of the outer and inner race surfaces 75 and 70 each having a V-shaped section is formed on a corresponding one of the fixed case 72 and inner race 71, the angular ball bearing 77 can be manufactured at a lower cost, the installation space of the angular ball bearing 77 can be reduced, and the length of the flexible type transmission device in the axial direction can be shortened. The remaining portions of the structure and operation of the present embodiment are similar to those of the previously described first embodiment.

Figure 5:
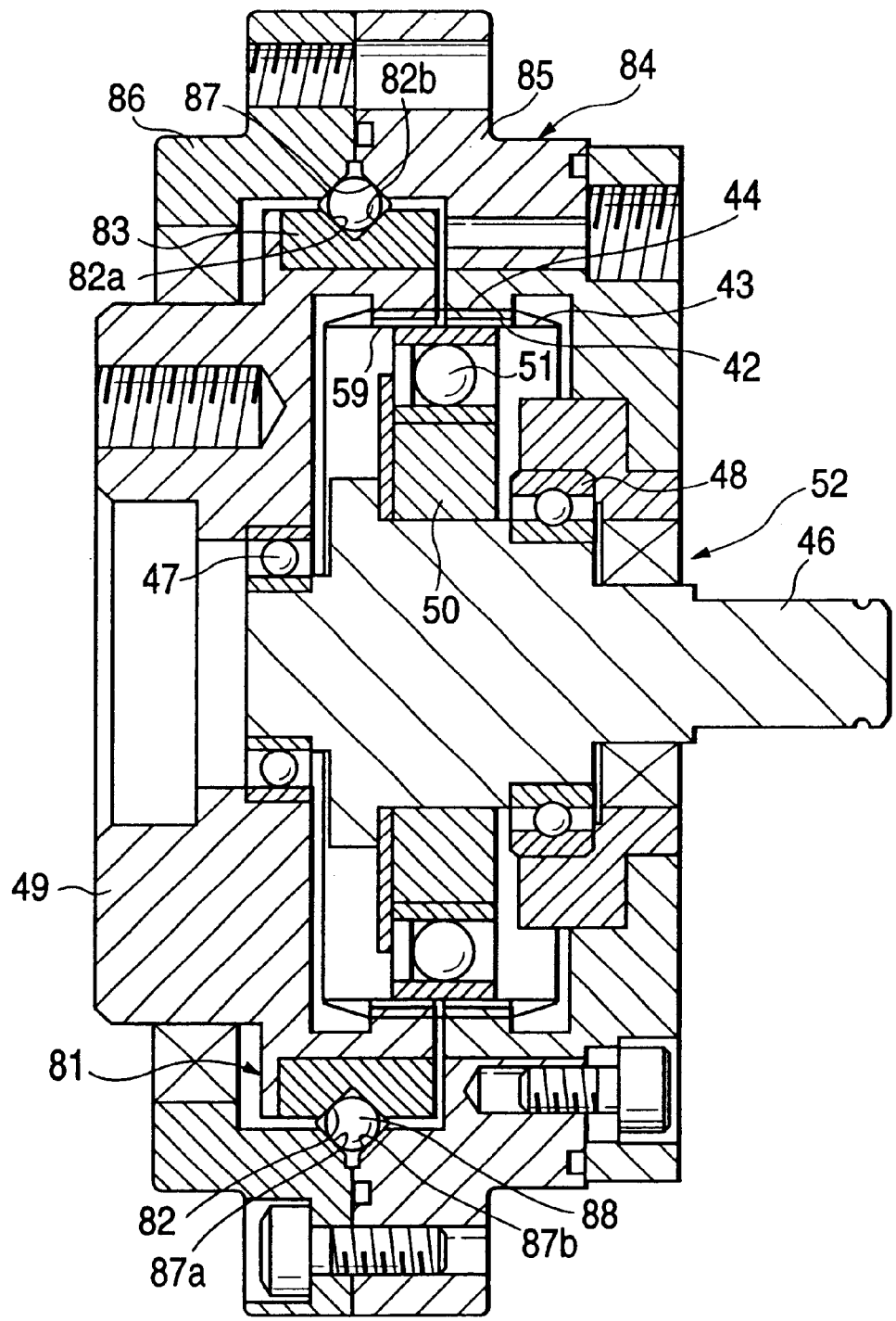
FIG. 5 is a front section view of a fourth embodiment of a flexible type transmission device according to the invention.

Now, FIG. 5 shows a fourth embodiment of a flexible type transmission device according to the invention. In the fourth embodiment, the angular ball bearing described in the third embodiment is applied to the flexible type transmission device described in the second embodiment. That is, an angular ball bearing 81 is made up of an inner race member 83 which includes on the outer periphery thereof an annular race surface 82 having a V-shaped section and is fixed to an output member 49, and a large number of steel balls 88 which can be rollingly contacted not only with the two inclined surfaces 82*a* and 82*b* of the race surface 82 of the inner race member 83 at two points but also with the two inclined surfaces 87*a* and 87*b* of a single annular race surface 87 having a V-shaped section and formed on the inner periphery of a fixed case 84, in particular, on the inner peripheries of a case main body 85 and an outer ring 86, respectively at two points. Each of the steel balls 88, which can be rollingly contacted at four points in total, are given two contact angles and the two contact angles are inclined in the mutually opposite directions. The remaining portions of the structure and operation of the fourth embodiment are similar to those of the second and third embodiments.

Figure 6:
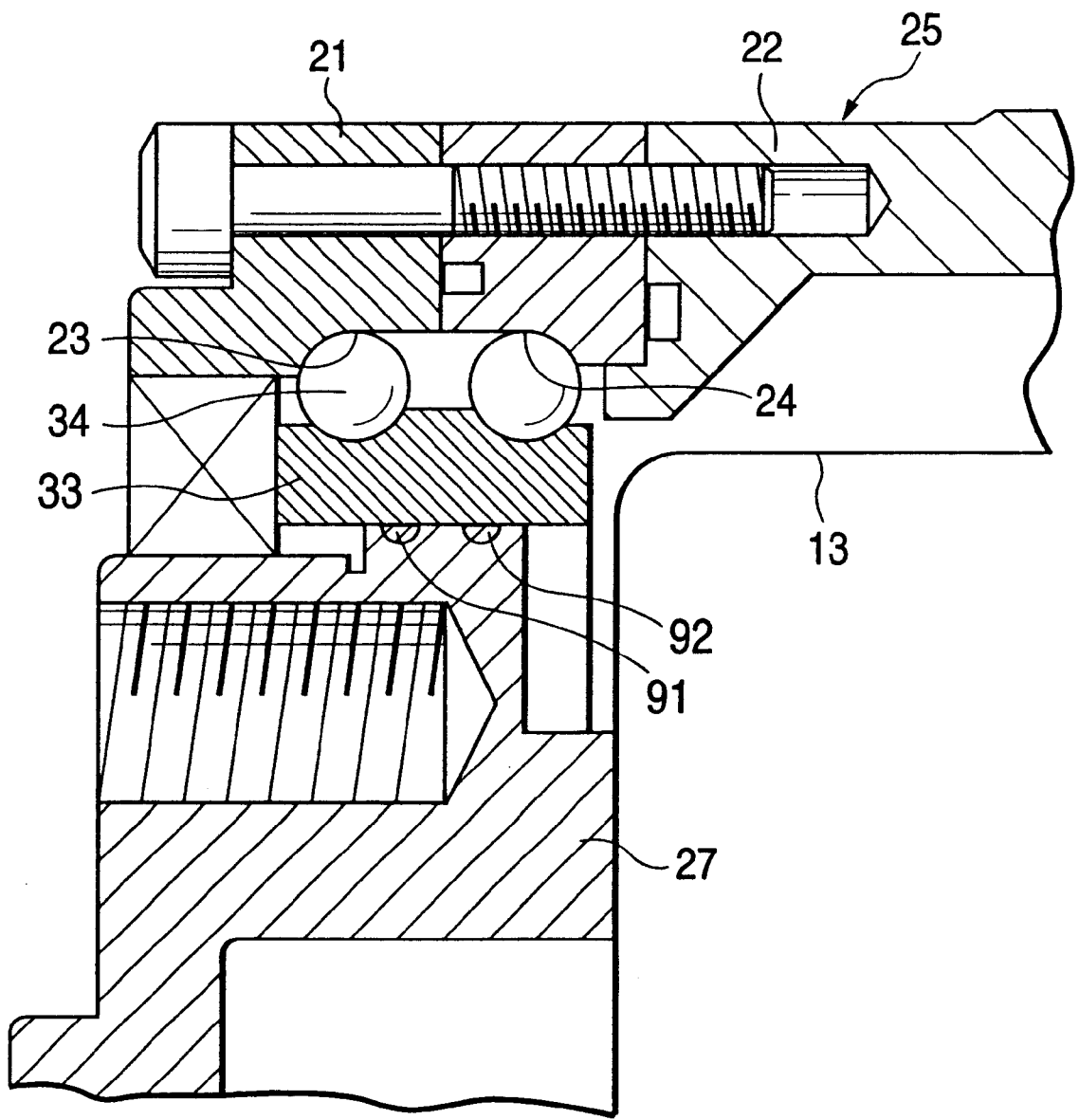
FIG. 6 is a section view of an inner race and its neighboring portion of a fifth embodiment of a flexible type transmission device according to the invention.
Figure 7:
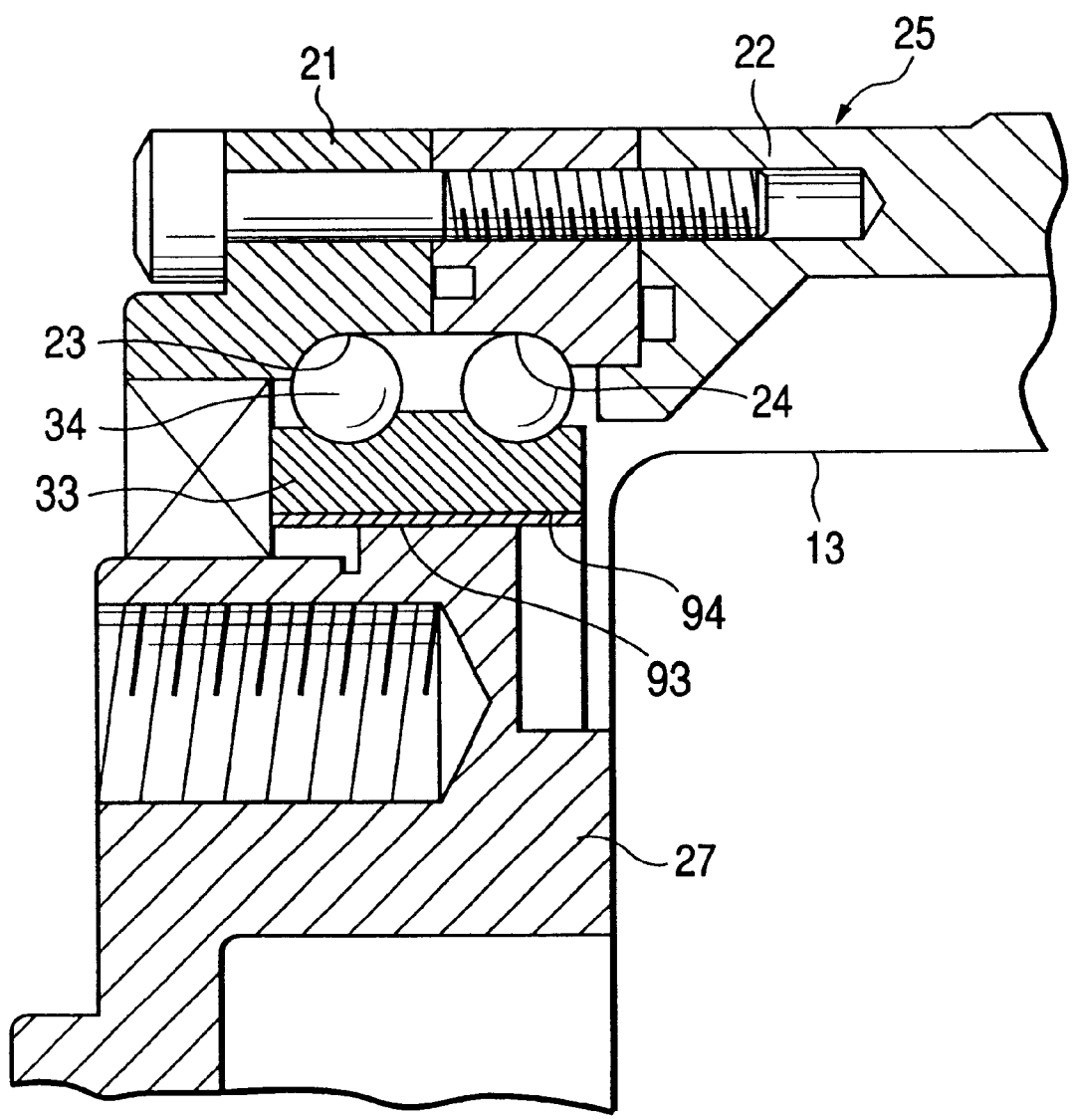
FIG. 7 is a section view of an inner race and its neighboring portion of a sixth embodiment of a flexible type transmission device according to the invention; and, FIG. 8 is a section view of an inner race and its neighboring portion of a seventh embodiment of a flexible type transmission device according to the invention.
Figure 8:
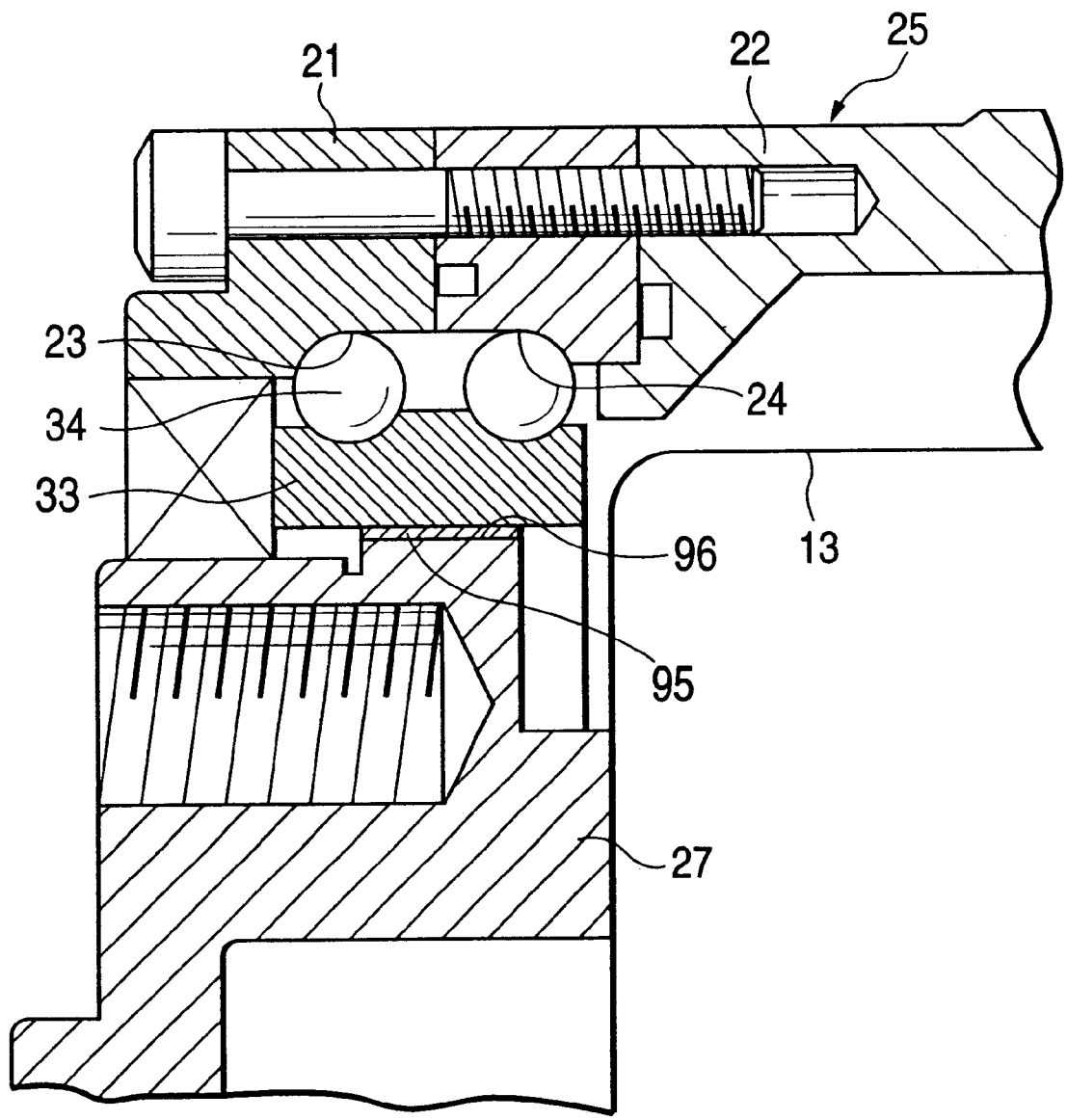

In the above-described embodiments, the case (fixed case 25, 55) is fixed whereas the rotation is taken out from the support member (output member 27, 49). However, this is not limitative but, according to the invention, the support member may be fixed whereas the rotation may be taken out from the case. Also, in the above-described embodiments, the double race angular ball bearing 30, 61 is structured such that the contact angles (lines) of the two races are inclined in the mutually opposite directions and broadened radially outwardly. However, according to the invention, the double race angular ball bearing may also be structured such that the contact angles (lines) of the two races are inclined in the mutually opposite directions and broadened radially inwardly. Further, in the above-described embodiments, the peripherally extending groove 38 is formed on the inner periphery of the inner race member 33 so that the adhesive is filled into the groove 38. However, according to the invention, as in a fifth embodiment shown in FIG. 6, a plurality of peripherally extending grooves 92 may be formed on the outer periphery of the output member 27 so that an adhesive 91 is filled into the grooves 92; or otherwise, as in a sixth embodiment shown in FIG. 7, a plurality of axially extending grooves 94 may be formed on the inner periphery of the inner race 33 which extend in the axial direction of the inner race member 33 and are spaced from each other in the peripheral direction thereof so that an adhesive 93 is filled into the grooves 94; or otherwise, as in a seventh embodiment shown in FIG. 8, a plurality of axially extending grooves 96 maybe formed on the outer periphery of the output member 27 which extend in the axial direction of the output member 27 and are spaced from each other in the peripheral direction thereof so that an adhesive 95 is filled into the grooves 96; or otherwise, a large number of recessed portions may be formed on the inner periphery of the inner race 33 or on the outer periphery of the output member 27 so that an adhesive is filled into the recessed portions. Also, in the above-described embodiments, the fixation between the output member 27 and inner race 33 is achieved by cooperation of pressure insertion and adhesive. However, this is not limitative but, according to the invention, such fixation can also be attained only through pressure insertion or only by using an adhesive; and, further, such fixation can also be accomplished by shrinkage fit, by brazing, by deposition, by welding, or by key connection.

As has been described heretofore, the invention provides a flexible type transmission device which not only can be manufactured at a low cost but also can extend its life.

What is claimed is:

1. A flexible transmission device, comprising:

a case having a plurality of internal teeth on an inner periphery thereof;

a flexible member having a plurality of external teeth on an outer periphery thereof, said flexible member being inserted into said case so that said plurality of external teeth partially mesh with said plurality of internal teeth when said flexible member is flexed and deformed in a substantially elliptical manner, said flexible member having a base disposed generally within said outer periphery along an end generally opposite from said plurality of external teeth;

a wave generator positioned within said flexible member and configured to apply substantially elliptical flexural deformation to said flexible member, said wave generator capable of rotating the location of deformation on said flexible member;

an output member located on said base of said flexible member and extending generally outwardly, generally away from the external teeth, along a generally perpendicular path relative to said base;

a secondary member disposed on the output member and spaced from said base of said flexible member, said secondary member extending generally radially outwardly from said output member and from said generally perpendicular path; and an angular ball bearing, interposed between said case and said secondary member for supporting said output member and said case while permitting relative rotation between said output member and said case.

2. A flexible transmission device as set forth in claim 1, wherein said flexible member and said output member are formed as a one-piece unit.

3. A flexible transmission device as set forth in claim 1, wherein said angular ball bearing comprises:

an inner race member having two annular race surfaces; and a plurality of steel balls disposed between at least one of said two annular race surfaces and at least one of two case annular race surfaces, each of said plurality of steel balls rollingly contacting one of said two annular race surfaces and a corresponding one of said two case annular race surfaces thereby defining a contact line connecting contact points, wherein the contact line for said plurality of steel balls in one of said two annular race surfaces and the contact line for said plurality of steel balls in the other of said two annular race surfaces are inclined in opposite directions with respect to a radially extending line.

4. A flexible transmission device as set forth in claim 3, wherein said inner race member is fixed to said output member such that said inner race member is pressure-fitted onto said output member with an adhesive interposed therebetween.

* * * * *